Oct. 13, 1925.                    P. PECK                    1,557,322
                          SPECTACLE FRONT FRAME
                            Filed Dec. 22, 1922
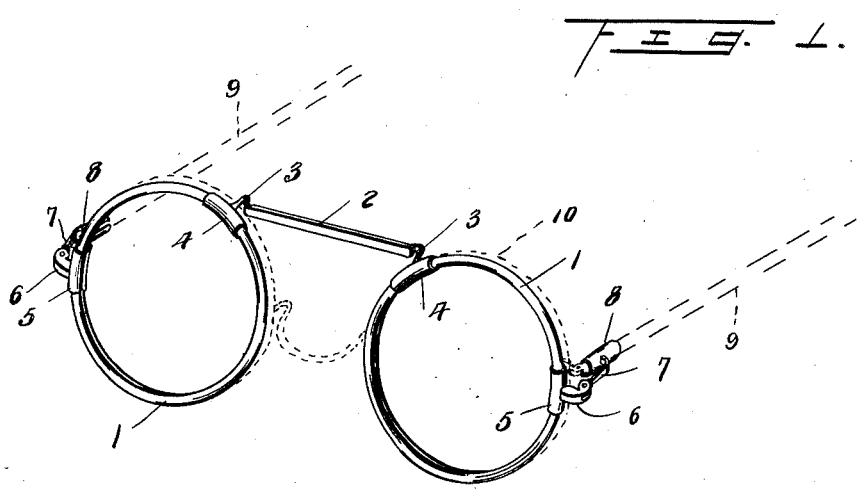
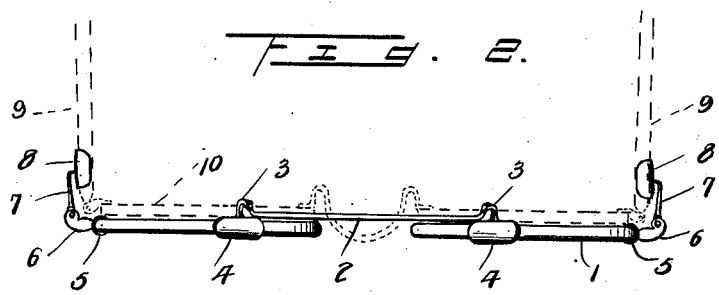
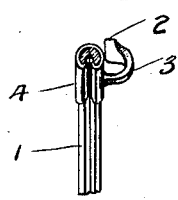
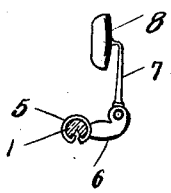
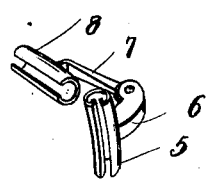
Inventor
P. Peck.

Patented Oct. 13, 1925.

1,557,322

UNITED STATES PATENT OFFICE.

PETER PECK, OF NICOLET, QUEBEC, CANADA.

SPECTACLE FRONT FRAME.

Application filed December 22, 1922. Serial No. 608,492.

*To all whom it may concern:*

Be it known that I, PETER PECK, a citizen of the United States, residing at Nicolet, in the Province of Quebec and Dominion of Canada, have invented certain new and useful Improvements in Spectacle Front Frames; and I do hereby declare the following to be a full, clear, and exact description of the invention, such as will enable others skilled in the art to which it appertains to make and use the same.

The invention relates to spectacles and more particularly to an attachment in the nature of a frame to be applied to rimless spectacles to strengthen and reinforce and give them the appearance of spectacles of the rim type.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a perspective view of a frame attachment for rimless spectacles embodying the invention, Figure 2 is a top view showing the frame attached to a pair of rimless spectacles, Figure 3 is a sectional detail showing more clearly the manner of attaching the rim connecting bar to a rim, Figure 4 is a sectional detail of the connection applied to a rim whereby the same may be detachably connected with the temple of a pair of spectacles, and Figure 5 is a detail perspective view of the temple connection.

Corresponding and like parts are referred to in the following description and designated in the several views of the drawings by like reference characters.

The invention contemplates a frame adapted to be detachably connected to the front of a pair of rimless spectacles, said frame comprising a pair of rims 1 of any material, form and construction, a bar 2 connecting the rims 1 and a temple connection attached to each of the rims 1.

The bar 2 is preferably of metal and may be of any design and each end is bent to provide a lateral loop 3 terminating in a clip 4 which is clinched about the rim 1. The lateral loops 3 at the ends of the bar 2 increase the resiliency of the connection between the bar and rim, whereby the frame may be more readily adapted to a pair of spectacles. Moreover, the clips 4 are offset with the result that the bar 2 and rim 1 are in different planes.

The temple connection embodies a clip 5 which is similar in construction to the clip 4 and is clinched about the rim 1. A stud 6 projects outwardly from the clip 5 and has an arm 7 pivoted thereto by means of a rule joint whereby the outward movement of the arm is limited. A clip 8 at the outer end of the arm 7 is adapted to engage the temple 9 of a pair of rimless spectacles 10, as indicated most clearly in Figure 2.

It will be understood from the foregoing that the invention enables a frame to be detachably fitted to the front of a pair of rimless spectacles to give the same the appearance of spectacles provided with rims, thereby enabling rimless spectacles to present the appearance of shell frame spectacles. Not only is the appearance of the spectacles changed but the same are materially strengthened and it is possible to repair the same temporarily in the event of the temple connection breaking away from the lens.

What is claimed is:

1. In a spectacle frame, a rim attaching clip having a stud projecting therefrom, an arm pivoted to said clip by means of a rule joint, and a clip at the free end of the arm adapted to detachably engage the temple of a spectacle.

2. In combination with spectacles having temples, a reinforcing frame adapted to be attached thereto comprising rims, a bar connecting said rims and offset therefrom, and means to detachably secure said frame to the temples, the offset portions of said bar engaging the spectacles lens to maintain the frame in position.

In testimony whereof I affix my signature.

PETER PECK.